Aug. 8, 1933.  B. S. FLORADAY  1,921,224
SEAT CONSTRUCTION
Filed Nov. 18, 1929   2 Sheets-Sheet 2
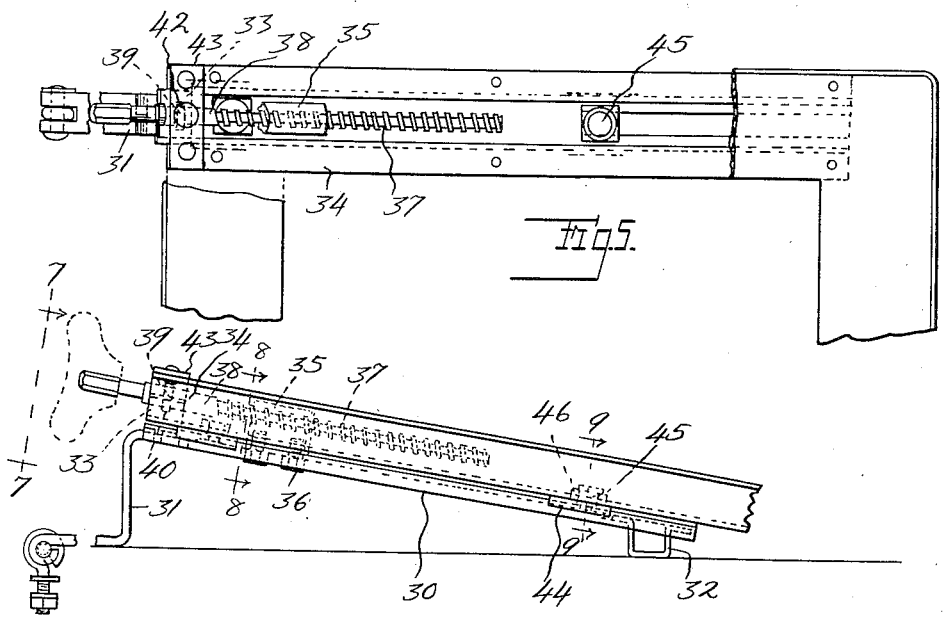
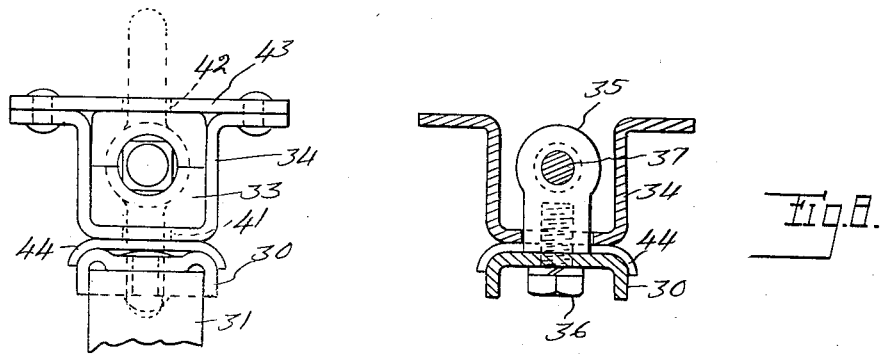
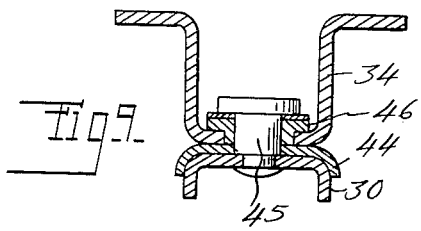
INVENTOR
Burton S. Floraday
BY
Whittemore Hulbert Whittemore Belknap
ATTORNEYS Patented Aug. 8, 1933

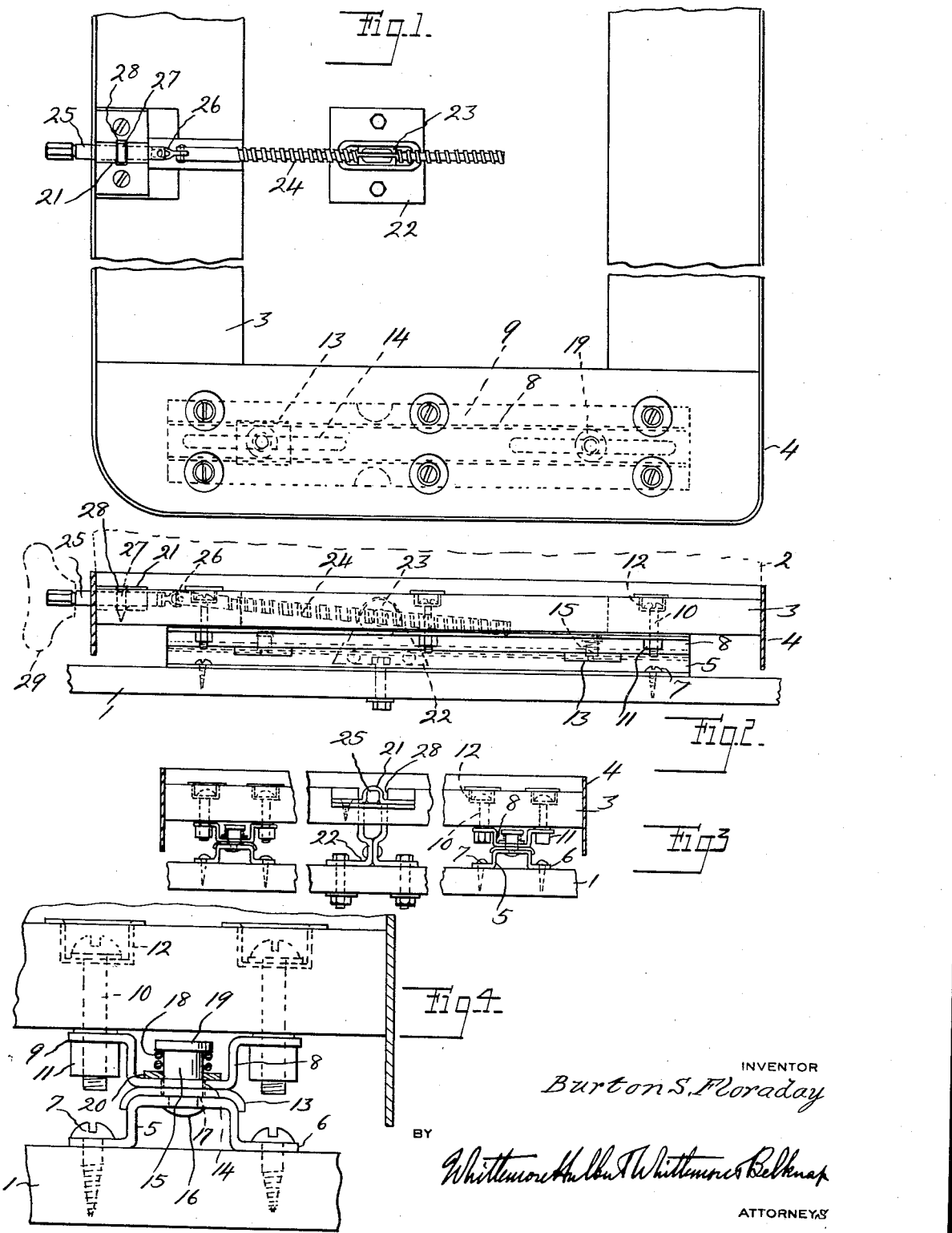

1,921,224

UNITED STATES PATENT OFFICE 1,921,224

SEAT CONSTRUCTION

Burton S. Floraday, Toledo, Ohio, assignor to the Dura Company, Toledo, Ohio, a Corporation of Ohio Application November 18, 1929
Serial No. 408,019

5 Claims. (Cl. 155—14)

The invention relates to seat constructions and refers more particularly to adjustable seat constructions adapted for use in connection with motor vehicle bodies. One of the objects of the invention is to provide an improved mounting for an adjustable seat so arranged that the mounting is of substantial construction and the seat may be readily adjusted. Another object is to so construct the mounting that the relatively movable parts are yieldably held together. With these as well as other objects in view, the invention resides in the novel features of construction and combinations and arrangements of parts as more fully hereinafter set forth.

In the drawings:—

Figure 1 is a plan view of an adjustable seat construction embodying the invention;

Figure 2 is an end view thereof;

Figure 3 is a front view thereof with the apron removed;

Figure 4 is an enlarged view of a portion of Figure 3;

Figures 5 and 6 are views similar to Figures 1 and 2, respectively, showing a modification;

Figures 7, 8 and 9 are cross sections on the lines 7—7, 8—8 and 9—9, respectively of Figure 6.

The invention relates in general to seats and is particularly applicable to the driver's seat of a motor vehicle, which may be adjusted forwardly or rearwardly, as desired by the driver.

As shown in Figures 1, 2, 3 and 4, 1 is the floor of a motor vehicle and 2 is the driver's seat having the frame 3, which latter is preferably encircled by the band or continuous apron 4, which extends above and below the frame.

To provide for adjusting the seat forwardly or rearwardly, I have mounted the seat near its ends upon parallel tracks which extend longitudinally of the vehicle. The mounting constructions at both ends are alike and therefore but one will be described. In detail, 5 is a channel-shaped track which is inverted and has the foot flanges 6 at the edges of its side flanges and resting upon the floor 1 and secured thereto by suitable means, such as the screws 7. 8 is a channel-shaped bracket member having the foot flanges 9 at the edges of its side flanges and secured to the bottom of the seat frame 3. The bracket member is secured to the seat frame by means of the bolts 10 and the nuts 11, the latter being clinched or secured to the foot flanges 9 and depending therefrom. The heads of these bolts are located within the sheet metal cups 12, which are set into the upper portions of the seat frame. Both the track member and bracket member are preferably formed of sheet metal or sheet steel and the web of the bracket member extends longitudinally above the web of the track member.

13 are sheet metal shoes extending over the web of the track member and embracing the latter at longitudinally spaced points, these shoes being preferably formed of a different material than the track and bracket members and particularly the latter, such a material being bronze, whereby the bracket member may be more easily moved over these shoes. The web of the bracket member is provided with the longitudinal slots 14 extending beyond the shoes. 15 are shouldered pins or studs extending through the slots 14, the shoes 13 and the web of the track member 5 and fixedly secured to the latter by the riveted-overheads 16 and the shoulders 17. 18 are coil springs encircling the upper portions of the pins or studs 15 and abutting the heads 19 at the upper ends thereof and the washers 20, the latter resting against the upper face of the web of the bracket member. With this construction it will be seen that the pins or studs guide each bracket member during its movement relative to its respective track member; that the shoes facilitate movement of each bracket member relative to its respective track member and that each bracket member is yieldably held in engagement with its respective shoes.

The mechanism for adjusting the seat forwardly or rearwardly comprises the bearing 21 which is secured to the front portion of the seat frame 3 near its middle and the bracket 22 which is secured to the floor 1 in rear of the bearing 21. The bracket 22 has horizontally journaled therein the nut 23, which is threadedly engaged by the screw 24, the front end of which is connected to the shaft 25 by the universal coupling 26. This shaft has a portion journaled in the bearing 21 and provided with the collar 27 fixed thereto and located in a transverse slot 28 in the bearing whereby the shaft is held from longitudinal movement relative to the bearing. The shaft extends forwardly of the seat frame and may have secured to its front end the handle 29. By turning this handle in either direction the screw is fed either forwardly or rearwardly through the nut in the bracket secured to the floor, thereby moving the seat either forwardly or rearwardly.

In the modification shown in Figures 5 to 9 inclusive the invention is shown as applied to a driver's bucket seat. In this construction the inverted channel-shaped track members 30 are inclined downwardly and rearwardly and are mounted upon the brackets 31 and 32, respectively, at the front and rear ends. 33 is a bearing secured in the front end of one of the channel-shaped bracket members 34 secured to the seat frame. 35 is a nut extending through the web of the same bracket 34 and fixed to the track 30 therebelow by the cap bolts 36. 37 is a screw at the rear end of and integral with the shaft 38 and threadedly engaging the nut. The shaft has a cylindrical portion journaled in the bearing 33 and provided with the collar 39 fixed thereto and engaging in the internal annular groove 40 in the bearing whereby the shaft is held from longitudinal movement relative to the bearing. The forward end of this shaft is located beyond the bearing and is adapted to receive an operating handle. The bearing 33 is formed of cooperating sections fitting within the forward end of the bracket 34 and fixed thereto by suitable means such as the pins 41 and 42, respectively, upon the lower section and engaging the web of the bracket and upon the upper section and engaging the plate 43 secured to the bracket.

44 are sheet bronze shoes above the web of the track 30 and embracing the latter at longitudinally spaced points. 45 are shouldered pins or studs extending through longitudinal slots in the web of the bracket 34 through the shoes 44 and through the web of the track 30 and fixedly secured to the latter. 46 are collars or bushings, preferably formed of bronze, encircling the pins or studs and located between the heads at the upper ends of these pins or studs and the collars or bushings for yieldably holding the parts in engagement.

With the above modified construction, the operating handle is located near one end of the driver's seat and preferably near the right end thereof so that it will not interfere with the driver.

What I claim as my invention is:

1. A mounting for an adjustable seat having a track member, a bracket member secured to the seat, a shoe between said members and formed of a different material than the latter, and means for yieldably holding said members against said shoe.

2. A mounting for an adjustable seat having a track member, a bracket member secured to the seat, one of said members having a longitudinal slot, a shoe between said members, and a pin extending through the slot in one of said members, the shoe and the other of said members.

3. A mounting for an adjustable seat having a channel-shaped track member, a channel-shaped bracket member secured to the seat with its web adjacent the web of said track member, a shoe stationary with respect to one of said members and slidably engaged by the other and formed of different material than the latter, and means for holding said members against the shoe.

4. A mounting for an adjustable seat having a stationary track member, a channel-shaped bracket member secured to the seat, a bearing within and secured to said bracket member, a nut secured to said track member and extending within said bracket member, and a shaft journaled in said bearing and held from longitudinal movement relative thereto and having a threaded portion engaging said nut.

5. A mounting for an adjustable seat comprising a track member, a bracket member secured to the seat and having a portion extending for a substantial distance in the direction of adjustment of the seat, a shoe embracing and secured to the portion aforesaid of the track member and slidably engaged by said bracket member, and means for holding said track and bracket members against said shoe.

BURTON S. FLORADAY.